(12) United States Patent
Baldwin

(10) Patent No.: US 9,528,573 B2
(45) Date of Patent: Dec. 27, 2016

(54) MULTI-SPEED TRANSMISSION

(71) Applicant: Ford Global Technologies, LLC, Dearborn, MI (US)

(72) Inventor: Reid Alan Baldwin, Howell, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 107 days.

(21) Appl. No.: 14/632,321

(22) Filed: Feb. 26, 2015

(65) Prior Publication Data
US 2015/0167792 A1    Jun. 18, 2015

Related U.S. Application Data

(63) Continuation-in-part of application No. 12/210,231, filed on Sep. 15, 2008, now Pat. No. 8,979,701.

(51) Int. Cl.
*F16H 48/06* (2006.01)
*F16H 3/66* (2006.01)

(52) U.S. Cl.
CPC ........... *F16H 3/66* (2013.01); *F16H 2200/006* (2013.01); *F16H 2200/0065* (2013.01); *F16H 2200/2012* (2013.01); *F16H 2200/2046* (2013.01)

(58) Field of Classification Search
CPC ............... F16H 3/66; F16H 2200/2046; F16H 2200/006; F16H 2200/0065; F16H 2200/2012
See application file for complete search history.

(56) References Cited

U.S. PATENT DOCUMENTS

| | | | |
|---|---|---|---|
| 6,176,803 B1 | 1/2001 | Meyer et al. | |
| 6,960,149 B2 | 11/2005 | Ziemer | |
| 7,524,259 B2 | 4/2009 | Raghavan | |
| 7,575,533 B2 | 8/2009 | Gumpoltsberger | |
| 7,686,731 B2 | 3/2010 | Raghavan | |
| 7,766,783 B2* | 8/2010 | Wittkopp | F16H 3/66 475/275 |
| 7,798,932 B2 | 9/2010 | Wittkopp et al. | |
| 8,079,932 B2 | 12/2011 | Phillips et al. | |
| 8,157,695 B2 | 4/2012 | Phillips et al. | |
| 2004/0102279 A1* | 5/2004 | Lee | F16H 3/666 475/276 |

(Continued)

FOREIGN PATENT DOCUMENTS

CN   1826483 A   8/2006
CN   101067440 A   11/2007

OTHER PUBLICATIONS

Benford, H.L, et al., The Lever Analogy: A New Tool in Transmission Analysis, Society of Automotive Engineers, Inc., 1982, pp.

(Continued)

*Primary Examiner* — David J Hlavka
(74) *Attorney, Agent, or Firm* — James Dottavio; Brooks Kushman P.C.

(57) ABSTRACT

A multiple speed power transmission including: an input shaft, an output shaft, a first gearing assembly imposing a fixed linear speed relationship among five shafts, a second gearing assembly imposing a fixed linear speed relationship among three shafts, two clutches, and four brakes capable of producing nine forward speed ratios and one reverse speed ratio when clutches and brakes are applied in combinations of two.

18 Claims, 7 Drawing Sheets

(56) References Cited

U.S. PATENT DOCUMENTS

2007/0072732 A1   3/2007 Klemen
2008/0227586 A1*  9/2008 Raghavan ................ F16H 3/66
                                                475/271
2009/0036255 A1*  2/2009 Phillips .................... F16H 3/66
                                                475/275

OTHER PUBLICATIONS

Chinese Office Action dated Mar. 13, 2013 for Application No. 200910177710.4, filed Sep. 15, 2009, pp. 1-2.

* cited by examiner

| Element Number | Number of teeth |
|---|---|
| 22 | 29 |
| 24 | 85 |
| 28 | 28 |
| 32 | 39 |
| 34 | 73 |
| 38 | 17 |
| 42 | 39 |
| 44 | 73 |
| 48 | 17 |
| 52 | 37 |
| 54 | 73 |
| 58 | 18 |

Fig. 2

| Ratio # | Brake 60 | Brake 62 | Brake 64 | Brake 66 | Clutch 68 | Clutch 70 | Speed Ratio | Ratio Step |
|---|---|---|---|---|---|---|---|---|
| Rev |  | X |  | X |  |  | -5.000 |  |
| Low | X |  |  | X |  |  | 5.783 | 1.57 |
| 1st | X |  |  | X |  | X | 3.693 | 1.34 |
| 2nd |  | X | X |  |  | X | 2.759 | 1.45 |
| 3rd |  | X |  |  |  | X | 1.906 | 1.36 |
| 4th |  |  | X |  |  | X | 1.404 | 1.40 |
| 5th |  |  |  |  | X | X | 1.000 | 1.31 |
| 6th |  |  |  |  | X |  | 0.765 | 1.15 |
| 7th |  |  |  |  | X |  | 0.664 | 1.11 |
| 8th | X |  |  |  | X |  | 0.595 |  |

Fig. 3

| Element Number | Number of teeth |
|---|---|
| 82 | 29 |
| 84 | 73 |
| 88 | 22 |
| 92 | 37 |
| 94 | 85 |
| 98 | 24 |
| 102 | 29 |
| 104 | 73 |
| 108 | 22 |
| 112 | 37 |
| 114 | 73 |
| 118 | 18 |

Fig. 6

| Ratio # | Brake 60 | Brake 62 | Brake 64 | Brake 66 | Clutch 68 | Clutch 70 | Speed Ratio | Ratio Step |
|---|---|---|---|---|---|---|---|---|
| Rev |  | X |  | X |  |  | -4.557 |  |
| Low | X |  |  | X |  |  | 4.532 |  |
| 1st | X |  |  | X |  | X | 2.682 | 1.69 |
| 2nd |  |  | X |  |  | X | 2.078 | 1.29 |
| 3rd |  | X |  |  |  | X | 1.566 | 1.33 |
| 4th |  |  | X |  | X |  | 1.258 | 1.24 |
| 5th |  | X |  |  | X | X | 1.000 | 1.26 |
| 6th |  |  |  |  | X |  | 0.777 | 1.29 |
| 7th |  |  |  |  | X |  | 0.664 | 1.17 |
| 8th | X |  |  |  | X |  | 0.579 | 1.15 |

Fig. 7

MULTI-SPEED TRANSMISSION

CROSS-REFERENCE TO RELATED APPLICATIONS

This application is a continuation-in-part of U.S. application Ser. No. 12/210,231 filed Sep. 15, 2008, now U.S. Pat. No. 8,979,701, issued Mar. 17, 2015, the disclosure of which is hereby incorporated in its entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

BRIEF DESCRIPTION OF THE DRAWINGS

FIG. 2 is a table showing proposed tooth numbers for the gears of the transmission illustrated in FIG. 1.

FIG. 3 is a table indicating the states of the clutches and the resulting speed ratios of the transmission in FIG. 1 when the gears have the number of teeth indicated in FIG. 2.

FIG. 6 is a table showing proposed tooth numbers for the gears of the transmission illustrated in FIG. 5.

FIG. 7 is a table indicating the states of the clutches and the resulting speed ratios of the transmission in FIG. 5 when the gears have the number of teeth indicated in FIG. 6.

DETAILED DESCRIPTION

Figure 1:
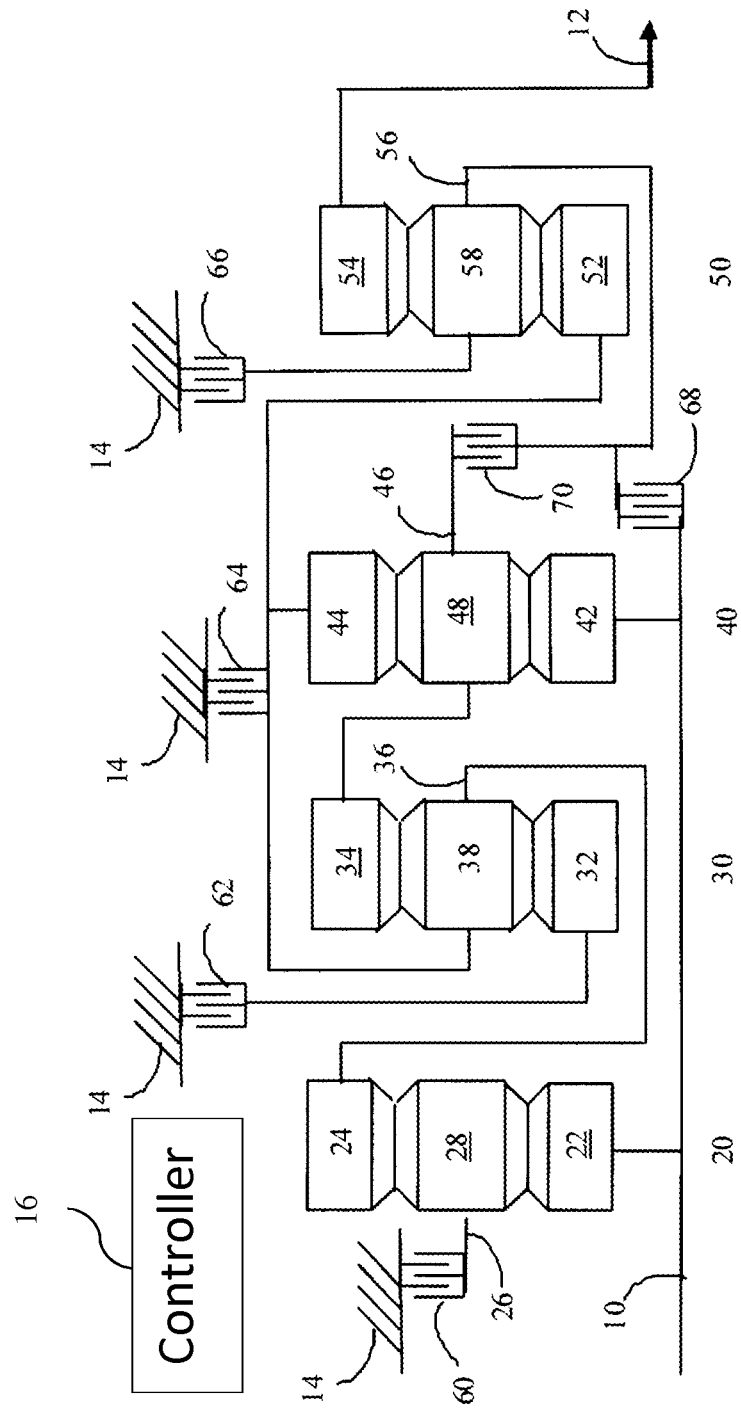
FIG. 1 is a schematic diagram of a transmission according to a first embodiment of the present invention which produces nine forward and one reverse speed ratios.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

A gearing arrangement is a collection of shafts and shift elements configured to impose specified speed relationships among the shafts. Some speed relationships, called fixed speed relationships, are imposed regardless of the state of any shift elements. Other speed relationships, called selective speed relationships, are imposed only when particular shift elements are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A proportional speed relationship is a reverse speed relationship if the shafts are constrained to rotate in opposite directions. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts, and iii) when the speeds of the shafts differ, they are constrained to be in the listed order, either increasing or decreasing.

A transmission according to a first embodiment of the present invention is illustrated schematically in FIG. 1. Input shaft 10 is driven by a vehicle engine, preferably via a torque converter. Output shaft 12 drives the vehicle wheels, preferably via a differential.

Four simple planetary gear sets 20, 30, 40, and 50 each have a sun gear with external gear teeth, a ring gear with internal gear teeth, a planet carrier, and a set of planet gears that are supported for rotation with respect to the carrier and mesh with both the sun gear and the ring gear. Sun gears 22 and 42 are fixedly coupled to input shaft 10. Ring gear 54 is fixedly coupled to output shaft 12. Ring gear 24, carrier 36, ring gear 44, and sun gear 52 are mutually fixedly coupled. Similarly, ring gear 34 and carrier 46 are fixedly coupled. Suggested tooth numbers for these gears are shown in FIG. 2.

Four brakes 60, 62, 64, and 66 selectively hold particular elements against rotation, providing a reaction torque. Preferably, these brakes are multi-plate friction brakes which hold the element to transmission case 14 when hydraulic pressure is applied to a piston. Brake 60 selectively holds carrier 26 to transmission case 14. Brake 62 selectively holds sun gear 32 to transmission case 14. Brake 64 selectively holds ring gear 24, carrier 36, ring gear 44, and sun gear 52 to transmission case 14. Brake 66 selectively holds carrier 56 to transmission case 14. Two clutches 68 and 70 selectively couple rotating elements to one another. These are preferably multi-plate friction clutches. Clutch 68 selectively couples input shaft 10 to carrier 56. Clutch 70 selectively couples carrier 46 and ring gear 34 to carrier 56.

FIG. 3 indicates the states of the shift elements for each of the nine forward ratios and the one reverse ratio. For each gear state, FIG. 3 indicates the speed ratio between input shaft 10 and output shaft 12 when the gears have the number of teeth shown in FIG. 2.

To launch the vehicle from rest in 1st gear, controller 16 commands engagement of brake 66 and clutch 70 while all other brakes and clutches are disengaged. To shift from 1st gear to 2nd gear, brake 66 is gradually disengaged while brake 60 is gradually engaged. To shift from 2nd gear to 3rd gear, brake 60 is gradually disengaged while brake 64 is gradually engaged. To shift from 3rd gear to 4th gear, brake 64 is gradually disengaged while brake 62 is gradually engaged. To shift from 4th gear to 5th gear, brake 62 is gradually disengaged while clutch 68 is gradually engaged. Clutch 70 remains engaged while operating in 1st through 5th gears. To shift from 5th gear to 6th gear, clutch 70 is gradually disengaged while brake 62 is gradually engaged. To shift from 6th gear to 7th gear, brake 62 is gradually disengaged while brake 64 is gradually engaged. Finally, to shift from 7th gear to 8th gear, brake 64 is gradually disengaged while brake 60 is gradually engaged. Clutch 68 remains engaged while operating in 5th through 8th gears.

A special low ratio is also available which may be used for special purposes such as off road usage or may be used to enable elimination of a torque converter. To select this ratio, controller 16 applies brake 60 and brake 66 while disengaging all other brakes and clutches. If the transmission does not include a torque converter or other dedicated launch device, the transmission is prepared for forward launch in low by engaging only brake 60. Then, brake 66 is gradually applied based on the torque demanded by the driver. To shift from low to 1st gear, brake 60 is gradually disengaged while clutch 70 is gradually engaged, maintaining brake 66 in the engaged state.

Reverse ratio is selected by applying brake 62 and brake 66 while disengaging all other brakes and clutches. If the transmission does not include a torque converter or other dedicated launch device, the transmission is prepared for reverse launch by engaging only brake 62. Then, brake 66 is gradually applied based on driver demand.

Figure 4:
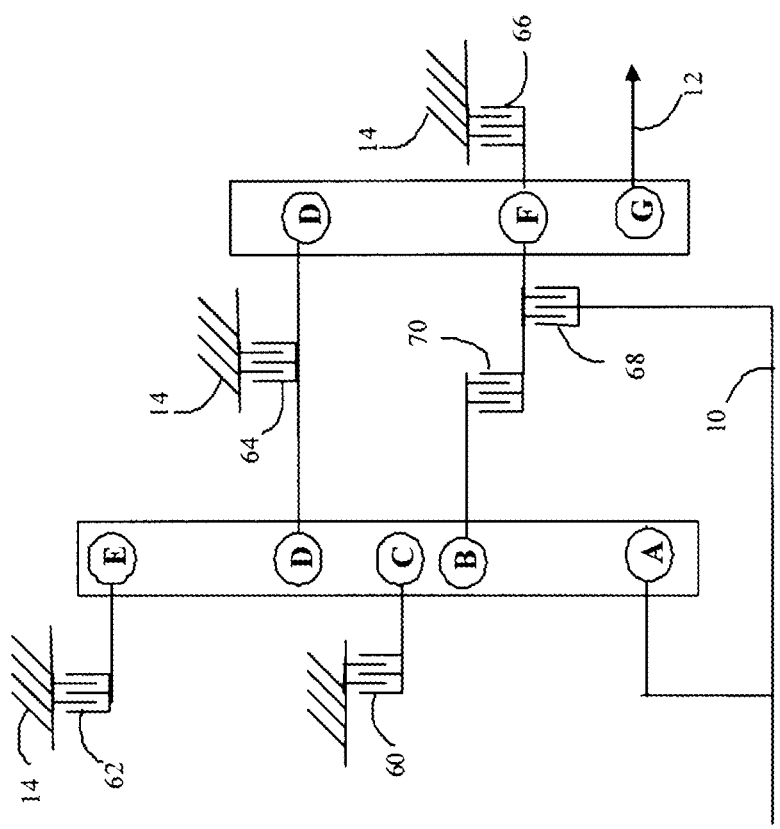
FIG. 4 is a lever diagram illustrating the speed relationships of a transmission according to the present invention.

FIG. 4 is a lever diagram illustrating the speed relationships among elements of a transmission according to the present invention. Gear sets 20, 30, and 40 of FIG. 1 collectively form a gearing assembly with five shafts that each rotate about the central axis. The gearing arrangement imposes a fixed linear speed relationship among the five shaft A, B, C, D, and E such that the speeds of any two of these shafts determine the speeds of the remaining three shafts. This fixed linear speed relationship is represented by the left lever in FIG. 4. Shaft A includes sun gear 22 and sun gear 42. Shaft B includes ring gear 34 and carrier 46. Shaft C includes carrier 26. Shaft D includes ring gear 24, carrier 36, and ring gear 44. Shaft E includes sun gear 32. Gear set 50 imposes a fixed linear speed relationship among shafts D, F, and G as represented by the right lever in FIG. 4. Shaft D includes sun gear 52 which is fixedly coupled to the remaining elements of shaft D mentioned above. Shaft F includes carrier 56. Shaft G includes ring gear 54.

When the gear sets of FIG. 1 have the tooth numbers indicated in FIG. 2, the speed of shaft B is equal to 0.6518 times the speed of shaft D plus (1−0.6518) times the speed of shaft A. These weighting factors impact the overall speed ratio in 1st through 5th gears. Similarly, the speed of shaft C is equal to 0.7456 times the speed of shaft D plus (1−0.7456) times the speed of shaft A. These weighting factors impact the ratio in low and 8th. The speed of shaft D is equal to 0.6054 times the speed of shaft E plus (1−0.6054) times the speed of shaft A. These weighting factors impact the reverse speed ratio. Finally, the speed of shaft F is equal to 0.3364 times the speed of shaft D plus (1−0.3364) times the speed of shaft G. These last weighting factors influence all of the ratios except direct drive. Many other configurations of planetary gear sets are available which produce weighting factors very close to this, including configurations that include double pinion planetary gear sets and gear sets that share planet gears. Any of these alternate configurations may be substituted and the same overall speed ratios will result.

Figure 5:
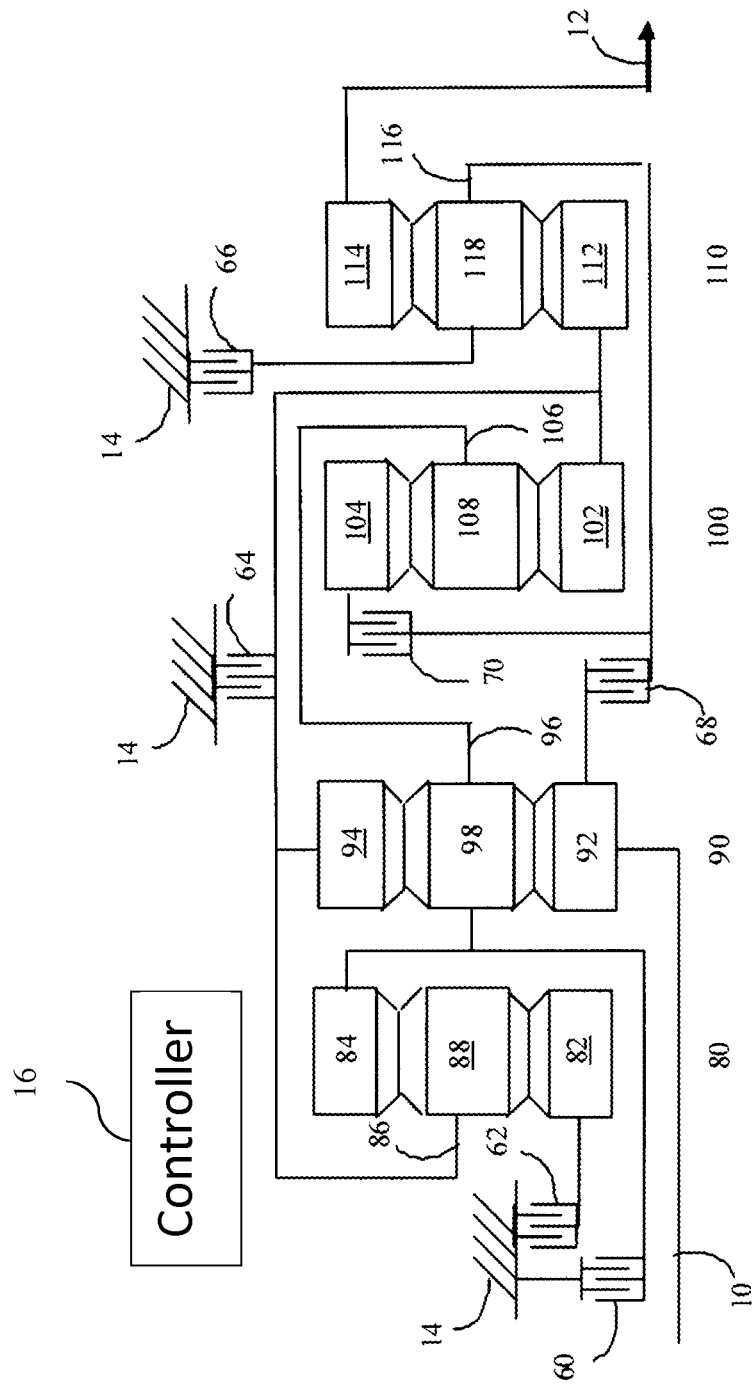
FIG. 5 is a schematic diagram of a transmission according to a second embodiment of the present invention which produces nine forward and one reverse speed ratios.

A transmission according to a second embodiment of the present invention is illustrated schematically in FIG. 5. This embodiment also corresponds to the lever diagram of FIG. 4, but uses a different configuration of planetary gear sets corresponding to the left lever. Input shaft 10 is driven by the vehicle engine, preferably via a torque converter. Output shaft 12 drives the vehicle wheels, preferably via a differential.

Four simple planetary gear sets 80, 90, 100, and 110 each have a sun gear with external gear teeth, a ring gear with internal gear teeth, a planet carrier, and a set of planet gears that are supported for rotation with respect to the carrier and mesh with both the sun gear and the ring gear. Sun gear 92 is fixedly coupled to the input shaft 10. Ring gear 114 is fixedly coupled to the transmission output shaft 12. Ring gear 84, carrier 96, and carrier 106 are mutually fixedly coupled. Similarly, carrier 86, ring gear 94, sun gear 102, and sun gear 112 are mutually fixedly coupled. Suggested tooth numbers for these gears are shown in FIG. 6.

Four brakes 60, 62, 64, and 66 selectively hold particular elements against rotation, providing a reaction torque. Brake 60 selectively holds ring gear 84, carrier 96, and carrier 106 to transmission case 14. Brake 62 selectively holds sun gear 82 to transmission case 14. Brake 64 selectively holds carrier 86, ring gear 94, sun gear 102, and sun gear 112 to transmission case 14. Brake 66 selectively holds carrier 116 to transmission case 14. Clutch 68 selectively couples the input shaft 10 to carrier 116. Clutch 70 selectively couples ring gear 104 to carrier 116.

FIG. 7 indicates the states of the shift elements for each of the nine forward ratios and the one reverse ratio. The operation of this embodiment is identical to the operation of the embodiment of FIGS. 1-3 as described above.

Gear sets 80, 90, and 100 form a gearing arrangement that imposes a fixed linear speed relationship among five shafts as represented by the left lever in FIG. 4. Shaft A includes sun gear 92. Shaft B includes ring gear 104. Shaft C includes ring gear 84, carrier 96, and carrier 106. Shaft D includes carrier 86, ring gear 94, and sun gear 102. Shaft E includes sun gear 82. Gear set 110 imposes the linear speed relationship represented by the right lever in FIG. 4. Shaft D includes sun gear 112 which is fixedly coupled to the elements listed above. Shaft F includes carrier 116. Shaft G includes ring gear 114.

When the gear sets of FIG. 5 have the tooth numbers indicated in FIG. 6, the speed of shaft B is equal to 0.5762 times the speed of shaft D plus (1−0.5762) times the speed of shaft A. Similarly, the speed of shaft C is equal to 0.6967 times the speed of shaft D plus (1−0.6967) times the speed of shaft A. The speed of shaft D is equal to 0.5671 times the speed of shaft E plus (1−0.5671) times the speed of shaft A. Finally, the speed of shaft F is equal to 0.3364 times the speed of shaft D plus (1−0.3364) times the speed of shaft G. Any alternate configuration of gearing that produce approximately these same relationships may be substituted without departing from the spirit of this invention.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
a first gearset selectively establishing a reverse speed relationship between an input and a first shaft;
a second gearset selectively establishing a proportional speed relationship between the first shaft and a second shaft;
a third gearset fixedly establishing a linear speed relationship among the input, the second shaft, and the first shaft; and
a fourth gearset fixedly establishing a linear speed relationship among the first shaft, a third shaft, and an output.

2. The transmission of claim 1 wherein the first gearset comprises:
a first sun gear fixedly coupled to the input;
a first ring gear as the first shaft;
a first planet carrier;
a first set of planet gears supported by the first planet carrier and meshing with both the first sun gear and the first ring gear; and
a first brake selectively holding the first planet carrier against rotation.

3. The transmission of claim 1 wherein the second gearset comprises:
a second sun gear;
a second ring gear as the second shaft;
a second planet carrier as the first shaft;
a second set of planet gears supported by the second planet carrier and meshing with both the second sun gear and the second ring gear; and
a second brake selectively holding the second sun gear against rotation.

4. The transmission of claim 1 wherein the third gearset comprises:
a third sun gear fixedly coupled to the input;
a third ring gear as the first shaft;
a third planet carrier as the second shaft; and
a third set of planet gears supported by the third planet carrier and meshing with both the third sun gear and the third ring gear.

5. The transmission of claim 1 wherein the fourth gearset comprises:
a fourth sun gear as the first shaft;
a fourth ring gear fixedly coupled to the output;
a fourth planet carrier as the third shaft; and
a fourth set of planet gears supported by the fourth planet carrier and meshing with both the fourth sun gear and the fourth ring gear.

6. The transmission of claim 1 further comprising:
a third brake selectively holding the first shaft against rotation;
a fourth brake selectively holding the third shaft against rotation;
a first clutch selectively coupling the third shaft to the input; and
a second clutch selectively coupling the third shaft to the second shaft.

7. A transmission comprising:
a first gearset selectively establishing a proportional speed relationship between a first shaft and a second shaft;
a second gearset fixedly establishing a linear speed relationship among an input, the second shaft, and the first shaft;
a third gearset selectively establishing a linear speed relationship among the first shaft, the second shaft, and a third shaft; and
a fourth gearset fixedly establishing a linear speed relationship among the first shaft, the third shaft, and an output.

8. The transmission of claim 7 wherein the first gearset comprises:
a first sun gear;
a first ring gear as the second shaft;
a first planet carrier as the first shaft;
a first set of planet gears supported by the first planet carrier and meshing with both the first sun gear and the first ring gear; and
a first brake selectively holding the first sun gear against rotation.

9. The transmission of claim 7 wherein the second gearset comprises:
a second sun gear fixedly coupled to the input;
a second ring gear as the first shaft;

a second planet carrier as the second shaft; and
a second set of planet gears supported by the second planet carrier and meshing with both the second sun gear and the second ring gear.

10. The transmission of claim 7 wherein the third gearset comprises:
a third sun gear as the first shaft;
a third ring gear;
a third planet carrier as the second shaft;
a third set of planet gears supported by the third planet carrier and meshing with both the third sun gear and the third ring gear; and
a first clutch selectively coupling the third ring gear to the third shaft.

11. The transmission of claim 7 wherein the fourth gearset comprises:
a fourth sun gear as the first shaft;
a fourth ring gear fixedly coupled to the output;
a fourth planet carrier as the third shaft; and
a fourth set of planet gears supported by the fourth planet carrier and meshing with both the fourth sun gear and the fourth ring gear.

12. The transmission of claim 7 further comprising:
a second brake selectively holding the first shaft against rotation;
a third brake selectively holding the second shaft against rotation;
a fourth brake selectively holding the third shaft against rotation; and
a second clutch selectively coupling the third shaft to the input.

13. A transmission comprising:
a first gearing arrangement configured to establish a fixed linear speed relationship among an input, a first shaft, a second shaft, a third shaft, and a fourth shaft;
a second gearing arrangement configured to establish a fixed linear speed relationship among an output, a fifth shaft, and the third shaft;
a first clutch configured to selectively couple the fifth shaft to the first shaft;
a first brake configured to selectively hold the fifth shaft against rotation;
a second brake configured to selectively hold the second shaft against rotation; and
a controller programmed to establish a first underdrive speed relationship between the input and the output by engaging the first brake and the second brake.

14. The transmission of claim 13 further comprising:
a second clutch configured to selectively couple the fifth shaft to the input; and
wherein the controller is further programmed to establish a first overdrive speed relationship between the input and the output by engaging the second clutch and the second brake.

15. The transmission of claim 14 further comprising:
a third brake configured to selectively hold the third shaft against rotation;
a fourth brake configured to selectively hold the fourth shaft against rotation; and
wherein the controller is further programmed to
establish a reverse speed relationship between the input and the output by engaging the first brake and the fourth brake,
establish a second underdrive speed relationship between the input and the output by engaging the first brake and the first clutch,
establish a third underdrive speed relationship between the input and the output by engaging the first clutch and the second brake,
establish a fourth underdrive speed relationship between the input and the output by engaging the first clutch and the third brake,
establish a fifth underdrive speed relationship between the input and the output by engaging the first clutch and the fourth brake,
establish a direct drive speed relationship between the input and the output by engaging the first clutch and the second clutch,
establish a second overdrive speed relationship between the input and the output by engaging the second clutch and the fourth brake, and
establish a third overdrive speed relationship between the input and the output by engaging the second clutch and the third brake.

16. The transmission of claim 13 wherein the first gearing arrangement comprises:
a first simple planetary gear set having a first sun gear fixedly coupled to the input, a first carrier as the second shaft, and a first ring gear as the third shaft;
a second simple planetary gear set having a second sun gear as the fourth shaft, a second carrier fixedly coupled to the first ring gear, and a second ring gear as the first shaft; and
a third simple planetary gear set having a third sun gear fixedly coupled to the input, a third carrier fixedly coupled to the second ring gear, and a third ring gear fixedly coupled to the second carrier.

17. The transmission of claim 13 wherein the first gearing arrangement comprises:
a first simple planetary gear set having a first sun gear as the fourth shaft, a first carrier as the third shaft, and a first ring gear as the second shaft;
a second simple planetary gear set having a second sun gear fixedly coupled to the input, a second carrier fixedly coupled to the first ring gear, and a second ring gear fixedly coupled to the first carrier; and
a third simple planetary gear set having a third sun gear fixedly coupled to the second ring gear, a third carrier fixedly coupled to the second carrier, and a third ring gear as the first shaft.

18. The transmission of claim 13 wherein the second gearing arrangement comprises a fourth simple planetary gear set having a fourth sun gear as the third shaft, a fourth carrier as the fifth shaft, and a fourth ring gear fixedly coupled to the output.

* * * * *